United States Patent Office 3,542,512
Patented Nov. 24, 1970

3,542,512
PREPARATION OF LITHIUM AMIDE
Sammy C. Honeycutt, Gastonia, N.C., assignor to Lithium Corporation of America, New York, N.Y., a corporation of Delaware
No Drawing. Filed Jan. 13, 1968, Ser. No. 705,255
Int. Cl. C01c 1/00; C07c 87/16; C09k 3/00
U.S. Cl. 23—190                                              9 Claims

ABSTRACT OF THE DISCLOSURE

Preparation of lithium amide in finely divided form comprising contacting lithium metal with liquid ammonia to form a lithium metal-liquid ammonia solution, and introducing the solution into a heated, inert liquid medium such as mineral oil to effect an immediate reaction between the lithium metal and the liquid ammonia to form a finely divided precipitate of lithium amide.

---

Various methods of preparing lithium amide are known. One of the more important commercial methods of preparing this compound involves reacting lithium hydride, formed from lithium metal and hydrogen, with ammonia gas at temperatures of the order of 450° C. Other known and suggested procedures for producing lithium amide involve evaporating liquid ammonia solutions of lithium containing catalytic amounts of various substances; reacting lithium nitride with ammonia gas at high temperatures; electrolyzing lithium salts in liquid ammonia solution under pressure; and reacting a mixture of lithium oxide and magnesium in liquid ammonia in a sealed reactor. These methods, and other known methods as well, suffer a number of disadvantages. Significant among these disadvantages are the facts that the lithium amide produced is generally relatively impure, and is commonly obtained in the form of agglomerates or cakes which must be ground before use. The necessity for grinding the cakes of lithium amide to place the amide in a free-flowing form not only adds to the production costs of the amide, but, also, has an adverse effect on its purity in that it is exposed to atmospheric moisture during grinding. The resultant take-up of moisture by the lithium amide reduces its purity by several percent. Added disadvantages, especially from an economic standpoint, of known methods of preparing lithium amide are higher raw material costs due, in the main, to the fact that, in general, lithium compounds, rather than lithium metal, are employed as starting materials, elevated temperatures are needed to effect formation of the amide, and the requirement, in most instances, that catalysts be used to accelerate the slow reaction between the lithium compound and the ammonia.

In accordance with the present invention, lithium amide is prepared in a manner and form which not only substantially eliminates the aforementioned economic disadvantages of prior art methods of preparing the compound, but, also, enables the amide to be obtained, directly, in a highly pure, finely-divided and, consequently, highly reactive, particulate form in essentially a single step. This is achieved at relatively low temperatures and without the necessity for the use of catalysts. Yields of the amide prepared by the method of this invention, furthermore, are, for all practical purposes, quantitative, and standard equipment can be employed in carrying out the method.

In brief, the method of the present invention involves the steps of contacting lithium metal with liquid ammonia to form a lithium metal-liquid ammonia solution. The solution is then introduced into a heated, substantially inert liquid medium. The reaction between the lithium metal and the liquid ammonia takes place substantially instantaneously in the heated liquid medium to form finely-divided particles of lithium amide. The lithium amide particles tend to remain suspended in the inert liquid medium and can be recovered therefrom by conventional procedures. The lithium amide, when recovered, after washing and drying, is in the form of a white, free-flowing powder having a particle size commonly in the range of about 1 to about 10 microns. Yields of lithium amide obtained by the method of this invention are, as stated, essentially quantitative, ranging in excess of 95%, usually 96% to 98%, based on the quantity of lithium metal used. The purity of the final product is uniformly high, ranging from 95% to 99%, usually 96% to 98%.

The method of the present invention can be carried out as a continuous, or semicontinuous, operation, as well as a batch operation. The manner in which contact between the lithium metal and liquid ammonia to form a lithium metal-liquid ammonia solution is variable and can be achieved in any convenient manner. In carrying out the method in a continuous, or semicontinuous, operation, for example, liquid ammonia, or ammonia gas which has been condensed to a liquid state, can be dropped onto a quantity of lithium metal in a container and the lithium metal-liquid ammonia solution formed can then be introduced directly into a vessel, containing a heated, inert liquid, connected to the lithium metal container. The reaction is carried out in a closed system. Hydrogen gas formed during the reaction, and any vaporized ammonia, are drawn off. The gaseous ammonia can be recondensed and recirculated into contact with the lithium metal. Any unreacted lithium metal can be recovered and reused.

The inert liquid medium into which the lithium metal-liquid ammonia solution is introduced can be selected from any one of various readily available materials. Such materials must be liquid at the particular reaction temperatures utilized and, of course, must not react with either the components of the lithium metal-liquid ammonia solution or the lithium amide which is formed. Generally speaking, it is especially advantageous to employ inert liquid hydrocarbons. Typical of suitable inert liquid media are mineral oils whose boiling point is advantageously above 200° C., and preferably at least 230° C., petrolatum, paraffin wax, tetrahydronaphthalene, and, in general, aliphatic, araliphatic or aromatic compounds, particularly hydrocarbons, with boiling points of at least 200° C. and preferably higher. Of the foregoing, mineral oils are preferred.

The temperature of the liquid medium both at the time the lithium metal-liquid ammonia solution is introduced, and during the formation of the lithium amide, is somewhat variable, but, generally speaking, it is especially desirable to operate in the range of from about 150° C. to about 250° C., and, more especially, in the range of from about 160° C. to about 210° C., with a range of from about 180° C. to about 200° C. being particularly preferred.

The reaction between the lithium metal and liquid ammonia is essentially instantaneous and exothermic in character. However, an excess of ammonia is always present in the lithium metal-liquid ammonia solution and the vaporization of the excess ammonia leads to a net cooling effect. In this same connection, the rate of addition of the solution to the heated, inert liquid medium should be regulated to maintain the temperature of the medium within the temperature range specified.

The concentration of lithium metal in the lithium metal-liquid ammonia solution is variable and in no way critical. The proportions of lithium metal-liquid ammonia solution and inert liquid medium employed also are variable. Generally speaking, the volume of inert liquid medium used need only be sufficient to enable the temperature of the reaction to be maintained within the range specified and to permit easy recovery of the formed lithium amide particles therefrom.

The finely-divided suspended lithium amide, as produced in the inert liquid medium, is easily handled and can be shipped as such very conveniently.

The following example is illustrative of the practice of the method of the present invention. It will be understood, however, that it is not to be construed as in any way limitative of the full scope of the invention since various changes can be made, without departing from the spirit of the teachings contained herein, in the light of the guiding principles which have been set forth above.

EXAMPLE 200 ml. of mineral oil were placed in a 500 ml. 3-neck round-bottomed flask. A thermometer was placed in one neck for measuring the mineral oil temperature, and in another neck an adapter was placed to allow the entrance of ammonia gas. A pressure-relieved dropping funnel containing 6.9 g. of lithium metal was placed in the third flask neck. A Dry-Ice condenser containing a Dry-Ice-acetone mixture as the cooling medium was attached to the top of the dropping funnel to condense the ammonia gas.

The mineral oil was heated to 200° C., and the ammonia gas was admitted to the flask. The ammonia gas travelled through the pressure relief tube to the Dry-Ice condenser where it condensed and dropped on the lithium metal forming a solution. The lithium-ammonia solution was dropped into the mineral oil at a rate which kept the mineral oil at 200° C. The ammonia and hydrogen gases from the reaction were immediately vaporized and finely-divided lithium amide was left suspended in the mineral oil. A small amount of unreacted lithium metal floated to the top and was skimmed off. The suspension of lithium amide in mineral oil was filtered under argon pressure, washed with dry hexane, weighed and assayed. 22.5 g. of 98% lithium amide were produced representing a yield of 96% based on lithium metal. The lithium amide was a white, free-flowing powder with particle size in the range of one micron.

The principles of the present invention have also been found to have utility for the production of various N-lithio amines, including monoamines and polyamines, as, for example, N-lithiomethylamine and N-lithioethylenediamine. These compounds are prepared by forming lithium metal solutions in the amines and then contacting such solutions with inert liquid media in which the formed N-lithio amines are insoluble, said inert liquid media being heated to a temperature at which the lithium and the amine react to form the N-lithio amine. The temperatures involved are variable. Thus, in the case of the preparation of N-lithiomethylamine and N-lithioethylenediamine, the temperature of the inert liquid media is desirably about 100° C. N-lithiomethylamine, for instance, as produced by the method of the present invention, after washing and drying, is a white, free-flowing powder which, when mixed with water, releases methylamine.

What is claimed is:
1. A method of preparing lithium amide in finely-divided form comprising contacting lithium metal with liquid ammonia to form a lithium metal-liquid ammonia solution, introducing the lithium metal-liquid ammonia solution into a heated, inert liquid medium at a temperature to form lithium amide and to effect precipitation thereof in finely-divided solid form, said steps being carried out in the absence of a catalyst, and recovering the finely-divided solid lithium amide from the inert liquid medium.

2. A method in accordance with claim 1 wherein the inert liquid medium is a mineral oil.

3. A method in accordance with claim 1 wherein the inert liquid medium is heated to a temperature of at least about 150° C.

4. A method in accordance with claim 3 wherein the lithium metal-liquid ammonia solution is incrementally introduced into the inert liquid medium.

5. A method in accordance with claim 4 wherein the inert liquid medium is a mineral oil and the temperature thereof is maintained in the range of from about 180° C. to about 200° C.

6. A method of preparing lithium amide in finely-divided form comprising contacting a liquid ammonia solution of lithium with a heated, inert liuid medium at a temperature to form lithium amide and to effect precipitation thereof in finely-divided solid form, said steps being carried out in the absence of a catalyst, and recovering the finely-divided solid lithium amide from the inert liquid medium.

7. A method in accordance with claim 6 wherein the liquid ammonia solution of lithium is incrementally added to the inert liquid medium.

8. A method in accordance with claim 7 wherein the inert liquid medium is a mineral oil having a boiling point in excess of 230° C.

9. A method in accordance with claim 8 wherein the mineral oil is maintained at a temperature in the range of from about 180° C. to about 200° C.

References Cited

UNITED STATES PATENTS 2,612,436   9/1952   Overhoff et al. _____ 23—190

OSCAR R. VERTIZ, Primary Examiner

H. S. MILLER, Assistant Examiner

U.S. Cl. X.R.

252—182; 260—583